US009483046B2

(12) United States Patent
Cudak et al.

(10) Patent No.: US 9,483,046 B2
(45) Date of Patent: Nov. 1, 2016

(54) PRINTING A THREE DIMENSIONAL OBJECT ABOUT A VOXEL STRUCTURE ASSEMBLED FROM PREFORMED BLOCKS

(71) Applicant: Lenovo Enterprise Solutions (Singapore) Pte. Ltd., Singapore (SG)

(72) Inventors: Gary D. Cudak, Creedmoor, NC (US); Luis J. Flores, Houston, TX (US); Christopher J. Hardee, Raleigh, NC (US); Xiaoli Shi, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 354 days.

(21) Appl. No.: 14/251,940

(22) Filed: Apr. 14, 2014

(65) Prior Publication Data

US 2015/0290880 A1    Oct. 15, 2015

(51) Int. Cl.
| | |
|---|---|
| *G05B 19/4099* | (2006.01) |
| *B29C 67/00* | (2006.01) |
| *B41J 3/407* | (2006.01) |
| *B33Y 50/00* | (2015.01) |
| *B33Y 10/00* | (2015.01) |
| *B33Y 50/02* | (2015.01) |

(52) U.S. Cl.
CPC ....... *G05B 19/4099* (2013.01); *B29C 67/0051* (2013.01); *B29C 67/0088* (2013.01); *B41J 3/4073* (2013.01); *B33Y 10/00* (2014.12); *B33Y 50/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,996,155 B2* | 3/2015 | Hiller | 700/118 |
| 2009/0173443 A1* | 7/2009 | Kozlak | B29C 67/0062 156/303.1 |
| 2013/0171019 A1 | 7/2013 | Gessler et al. | |

FOREIGN PATENT DOCUMENTS

| | | |
|---|---|---|
| EP | 1766585 A1 | 3/2007 |
| EP | 2486547 A1 | 8/2012 |
| WO | WO2010011911 A2 | 1/2010 |
| WO | WO2012085914 A1 | 6/2012 |

OTHER PUBLICATIONS

Luo, et al., "Chopper: Partitioning Models into 3D-Printable Parts", ACM, vol. 31, No. 6, Article 129, Nov. 2012.*

(Continued)

*Primary Examiner* — Qing Wu
(74) *Attorney, Agent, or Firm* — Jeffrey L. Streets

(57) ABSTRACT

A computer program product includes a computer readable storage medium having program instructions embodied therewith, where the program instructions are executable by a processor to cause the processor to perform a method. The method comprises obtaining data describing external surfaces of a three dimensional object to be made using a three dimensional printer; determining, for a given voxel size, a voxel structure having a size and a shape to be subsumed within the external surfaces of the object; outputting user instructions for manually assembling the voxel structure and positioning the voxel structure into the three dimensional printer; and printing material onto the assembled voxel structure to form an object that subsumes the voxel structure. The use of a voxel structure can reduce print time and the amount of print resources required to form an object.

20 Claims, 7 Drawing Sheets

(56) References Cited

OTHER PUBLICATIONS

Wang, et al., "Cost-effective Printing of 3D Objects with Skin-Frame Structures", ACM, vol. 32, No. 6, Article 288, Nov. 2013.*
Olivia Williams, "An Aston Martin that won't cost the Earth! Computer programmer begins work on replica of 1961 classic with the help of a 3D printer", Published: 12:32 EST, Aug. 4, 2013, http://www.dailymail.co.uk/sciencetech/article-2384439/An-Aston-Martin-wont-cost-Earth, 8 pages.
Weiming Wang et al., "Cost-effective Printing of 3D Objects with Skin-Frame Structures", Cost-effective 3D Printing, http://staff.ustc.edu.cn/~lgliu/Projects/2013_SigAsia_3DPrinting/default.htm, ACM Transactions on Graphics (Proc. SIGGRAPH Aisa), 32(5), 2013, Oct. 18, 2013, 6 pages.

* cited by examiner

PRINTING A THREE DIMENSIONAL OBJECT ABOUT A VOXEL STRUCTURE ASSEMBLED FROM PREFORMED BLOCKS

BACKGROUND

1. Field of the Invention

The present invention relates to methods of three-dimensional printing.

2. Background of the Related Art

Three-dimensional (3D) printing is a process of making a three-dimensional object from a digital model using an additive process, where successive layers of material are laid down over previous layers. The material may be a thermoplastic polymer filament that is heated and extruded through a narrow nozzle. In one type of three dimensional printer, the nozzle, the table supporting the material, or both is moved to control where the material is deposited. Other types of three dimensional printers may use alternative mechanisms to control the position of a nozzle for dispensing the material.

3D printing is becoming a big industry with a growing number of printer manufacturers and web sites that provide construction plans in the form of a data file for downloading to a computer. Unfortunately, 3D printing is much more complex than 2D printing and requires much more time to produce an object. Objects that are printed at a fine level of detail and are not tiny can take many hours to complete. Ideally, a 3D print job is not started unless there is enough time and materials to complete the job.

BRIEF SUMMARY

One embodiment of the present invention provides a computer program product comprising a computer readable storage medium having program instructions embodied therewith, where the program instructions are executable by a processor to cause the processor to perform a method. The method comprises obtaining a data file that includes print instructions for causing a three dimensional printer to print a three dimensional object, wherein the data file describes external surfaces of the object, determining, for a given voxel size, a voxel structure having a size and a shape to be subsumed within the external surfaces of the object, outputting user instructions for manually assembling the voxel structure and positioning the voxel structure into the three dimensional printer, and printing material onto the assembled voxel structure to form an object that subsumes the voxel structure.

DETAILED DESCRIPTION

Figure 1:
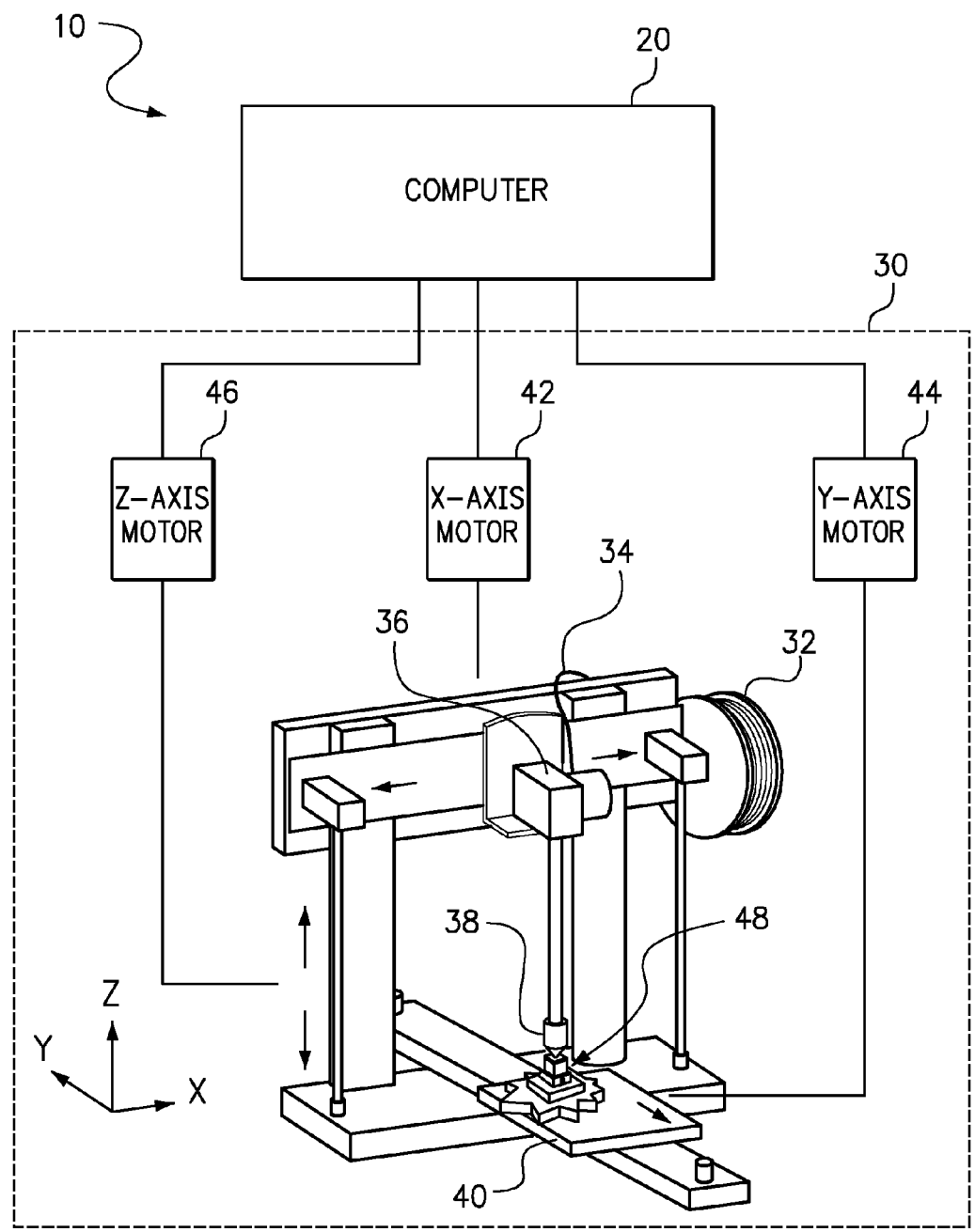
FIG. 1 is a diagram of a computer controlling a three-dimensional printer.

One embodiment of the present invention provides a method comprising obtaining a data file that includes print instructions for causing a three dimensional printer to print a three dimensional object, wherein the data file describes external surfaces of the object; determining, for a given voxel size, a voxel structure having a size and a shape to be subsumed within the external surfaces of the object; outputting user instructions for manually assembling the voxel structure and positioning the voxel structure into the three dimensional printer; and printing material onto the assembled voxel structure to form an object that subsumes the voxel structure.

The term "voxel" is a combination of the terms "volume" and "pixel", such that a voxel represents a grid position in three-dimensional space. The term "voxel structure" means a physical assembly of adjacent voxels. A preferred voxel structure will be secured together in some manner, such as using adhesive, tackiness, or mechanical interlocking, so that the voxel structure can be handled without disturbing the relative positions of components used to assemble the voxel structure.

In accordance with various embodiments of the invention, a voxel structure may be formed from two or more preformed components selected from a plurality of preformed components, wherein each preformed component has a predetermined shape, size and mass. For example, the preformed components may be rectangular cuboid blocks, including cubes. If the components include interlocking features for securing two or more of the rectangular blocks together in a desired configuration, those features may extend from, or recess into, the components.

The data file describes or defines the external surfaces or boundaries of the three-dimensional object to be printed. Accordingly, this data file may be used to determine a suitable voxel structure that may be subsumed within the object. Optionally, the voxel structure may be optimized to minimize the amount of printing necessary to complete the object, but such optimization is not required.

In a further embodiment, one or more orientation block may be included in a predetermined position within the voxel structure, wherein the orientation block has a unique and detectable characteristic, such as color or an identifier printed or adhered on an exposed surface of the block. Accordingly, the assembled voxel structure may be scanned after being positioned within the three-dimensional printer to determine the orientation of the voxel structure. In order to print material onto the voxel structure to form the object, control of the three-dimensional printer may be modified to adjust to the determined orientation of the voxel structure. Optionally, colored blocks may be positioned within various regions of the voxel structure to indicate the desired colors of the respective regions. Still further, if the scan indicates that the voxel structure is not the correct shape, size or orientation, the printer or computer may output a warning to the user.

The voxel structure may be manually assembled by following user instructions. The user instructions may be output by illustrating a model of the voxel structure on a display screen, or by providing step-by-step text describing how to assemble the voxel structure. Preferably, the user will have access to an inventory of the preformed components.

The voxel structure is configured to have a size and shape that will be subsumed within the completed object. Preferably, the voxel structure is configured so that the object will have at least a minimum depth or thickness of printed material around all sides, or all sides except the base. The minimum depth of printed material for any particular object may be user-configurable, and may be stored in association with the data file for that object. The minimum depth setting may be changed to make an object more or less sturdy or durable. Optionally, the voxel structure may have no downwardly facing surfaces other than along the base of the assembled voxel structure. However, any limitations on the shape of the voxel structure are primarily a function of the limited capabilities of a particular three-dimensional printer.

Printing material onto the voxel structure may allow the object to be formed in less time than without the voxel structure. This is generally true due to the reduced amount of printing that is necessary. Depending upon the shape of the voxel structure, the act of printing material onto the voxel structure may include printing material onto upward-facing surfaces and side-facing surfaces of the voxel structure. Preferably, material is printed onto surfaces of the voxel structure until the voxel structure is hidden within the interior of the object. The printed material preferably also secures the voxel structure together and provides contour around the voxel structure.

While three-dimensional printers have been designed to print various materials, one preferred type of material includes thermoplastic polymers. Various thermoplastic polymers may be used, including acrylonitrile butadiene styrene (ABS), polycarbonate (PC), polylactic acid (PLA), high density polyethylene (HDPE), PC/ABS, and polyphenylsulfone (PPSU).

In another embodiment, the method may further include printing a base portion of the object, and then positioning the assembled voxel structure into the three-dimensional printer on the base portion before printing material onto the voxel structure to form an object that subsumes the voxel structure. A base portion can use merely to hide the voxel structure from being viewable across the base of the completed object when the object is lifted and turned over. However, a base portion may also be used to provide a three-dimensionally contoured base to the object, such as where a base portion of the object has at least one region with space below the at least one region. After printing the base portion, the printer may pause for a user to position the voxel structure onto the base. Optionally, the base portion may be printed to include a recess having a shape and size for receiving the assembled voxel structure.

Another embodiment of the present invention provides a computer program product comprising a computer readable storage medium having program instructions embodied therewith, where the program instructions are executable by a processor to cause the processor to perform a method. The method comprises obtaining a data file that includes print instructions for causing a three dimensional printer to print a three dimensional object, wherein the data file describes external surfaces of the object, determining, for a given voxel size, a voxel structure having a size and a shape to be subsumed within the external surfaces of the object, outputting user instructions for manually assembling the voxel structure and positioning the voxel structure into the three dimensional printer, and printing material onto the assembled voxel structure to form an object that subsumes the voxel structure.

The foregoing computer program product may further include program instructions for implementing or initiating any one or more aspects of the methods described herein. Accordingly, a separate description of the methods will not be duplicated in the context of a computer program product.

FIG. 1 is a diagram of a system 10 including a computer 20 controlling a three-dimensional printer 30. This three-dimensional printer 30 includes a filament spool 32 for supplying a plastic filament 34 into an extruder 36. The heated plastic is pushed through a nozzle 38 onto a print bed or table 40 where the object is printed. As shown, the object 48 has already received a number of layers of plastic material, such that the nozzle is some distance above the table 40.

The position of the tip of the nozzle 38 determines where a thin layer of the plastic material will be placed. As the plastic passes through the nozzle 38, the nozzle 38 may be moved back and forth along an X-axis by an X-axis motor 42, and the table 40 may be moved back and forth along a Y-axis by a Y-axis motor 44. As each layer has been completed in the X-Y plane, the table may be moved down along a Z-axis by a Z-axis motor 46 so that another layer of the plastic may be applied through the nozzle moving in along the X-axis while the object or work piece is moved along with the table along the Y-axis. The printer also includes structural members that guide the nozzle along the X-axis, guide the table along the Y-axis, and guide the table along the Z-axis. The computer 20 provides instructions to the printer 30 to operate the X-axis motor 42, the Y-axis motor 44, and the X-axis motor 46 in a manner that positions the nozzle 38 where is can progressively build the object.

Figure 2:
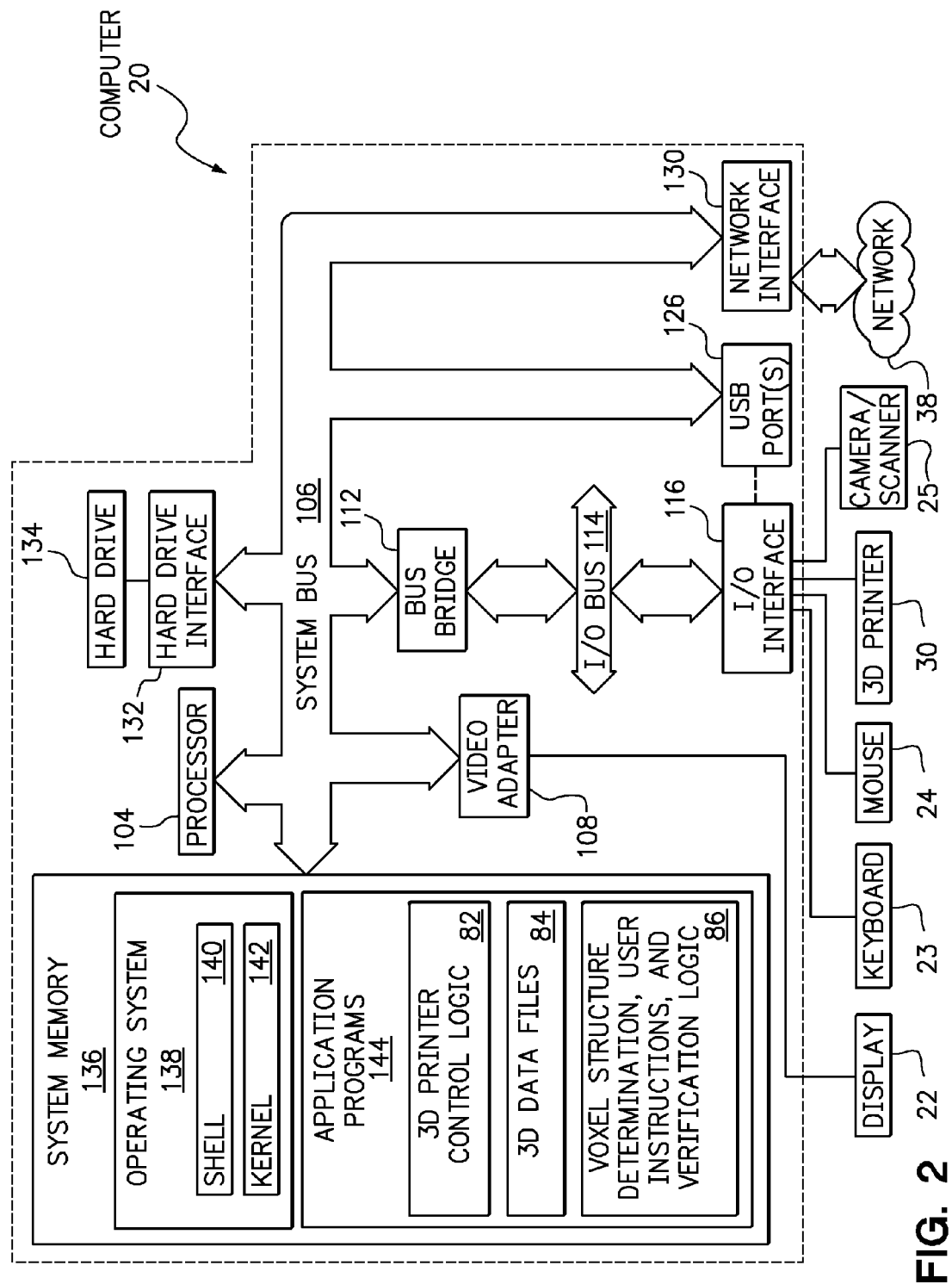
FIG. 2 is a diagram of a computer according to one embodiment of the present invention.

FIG. 2 is a diagram of an exemplary computer 20 that may be used in accordance with one embodiment of the present invention. The computer 20 includes a processor unit 104 that is coupled to a system bus 106. Processor unit 104 may utilize one or more processors, each of which has one or more processor cores. A video adapter 108, which drives/supports a display 22, is also coupled to system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 23, a mouse 24, a camera or scanner 25 and a 3D printer 30. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 20 is able to communicate over a network 38 using a network interface 130. The network 38 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 20 may include various programs and modules for implementing the methods described herein, such as the 3D printer control logic 82, the 3D data files 84, and voxel structure determination, user instructions, and verification logic 86.

The hardware elements depicted in computer 20 are not intended to be exhaustive, but rather are representative components suitable to perform the processes of the present invention. For instance, computer 20 may include alternate memory storage devices such as magnetic cassettes, digital versatile disks (DVDs), Bernoulli cartridges, and the like. These and other variations are intended to be within the spirit and scope of the present invention.

Figure 3A:
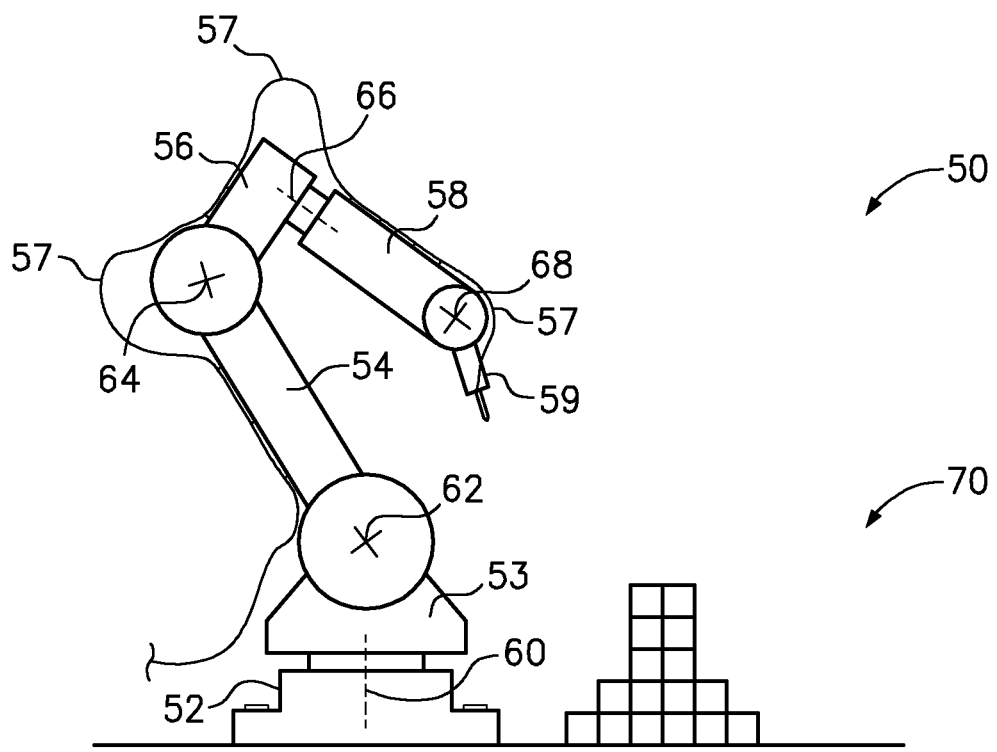
FIGS. 3A-B are diagrams of an alternative three-dimensional printer.
Figure 3B:
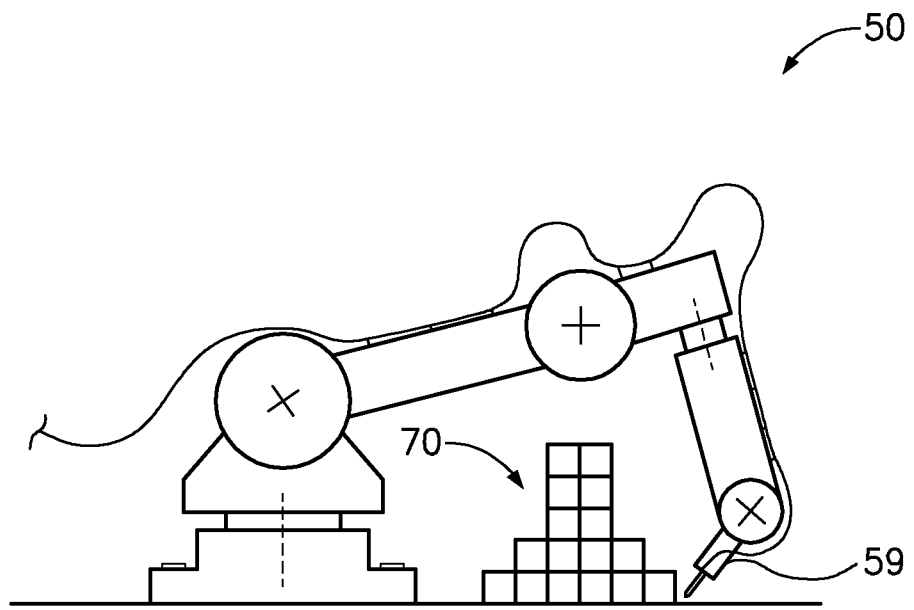

FIGS. 3A-B are diagrams of an alternative three-dimensional printer 50. The 3D printer 50 has a stable base 52 and various arms 54, 56, 58. The base and the arms are pivotally coupled with various axis. For example, the base 52 has a vertical axis 60 so that an upper portion 53 of the base, as well as the entire assembly above the upper portion 53, can rotate. The upper portion 53 of the base and the first arm 54 are pivotally coupled about a first horizontal axis 62, and the first arm 54 is pivotally coupled to the second arm 56 about a second horizontal axis 64. The second arm 56 and the third arm 58 are pivotally coupled about the axis 66, which is perpendicular to the axis 66. Further still, the nozzle 59 is pivotally coupled to the third arm 58 about the axis 68. The pivot angle between each pair of the foregoing components can be independently controlled by a motor receiving control signals from a computer or similar controller. Accordingly, the tip of the nozzle 59 can be positioned to dispense material in three-dimensions and in various angular orientations. In the embodiment shown, the material is delivered to the nozzle 59 through a tube 57 from a material source (not shown).

As shown in FIG. 3A, a voxel structure 70 is positioned in a print area where the printer 50 can print around the voxel structure. As shown in FIG. 3B, the three-dimensional printer 50 has moved under computer control to position the nozzle 59 to print material onto the voxel structure 70. The flow of material through the nozzle 59 may be controlled by a pump (not shown) and/or a valve (not shown) receiving control signals from the computer.

Figure 4A:
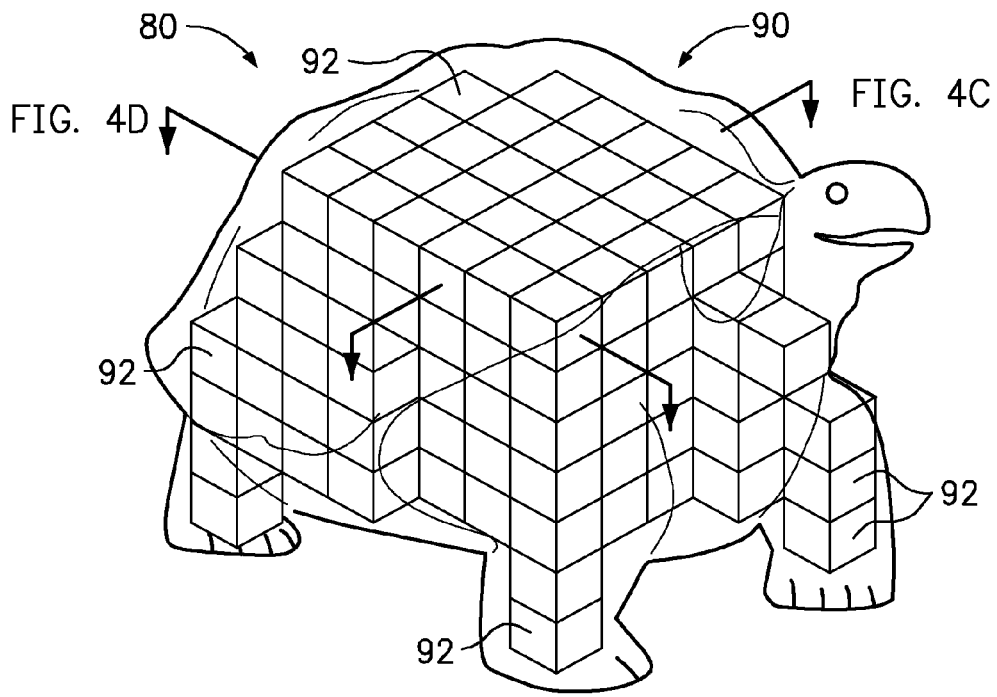
FIGS. 4A-B are diagrams of a three-dimensional object and a voxel structure subsumed within the three-dimensional object.

FIG. 4A is a diagram of a three-dimensional object (a turtle) 80 and a voxel structure 90 subsumed within the three-dimensional object. A data file describing the object 80 can be overlaid with a three-dimensional grid having voxels 92 with dimensions matching available rectangular cuboid blocks. Those voxels that are subsumed within the boundaries of the object 80 may be included in the voxel structure 90.

Figure 4B:
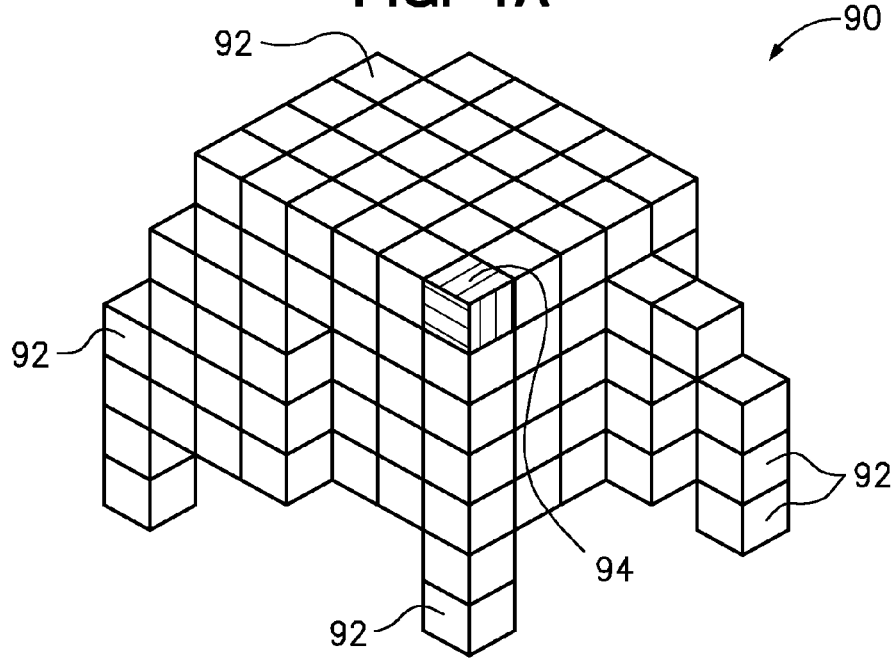

FIG. 4B is a diagram of the voxel structure 90 that may be assembled and positioned in a print area for printing material around the voxel structure. User instructions may be provided detailing the desired voxel structure. As shown, the voxel structure 90 is assembled from a plurality of voxels 92, including an orientation block 94 that is colored or displays other information about the voxel structure. If the printer or computer is equipped with a scanner, this orientation block 94 may be identified as providing the orientation of the voxel structure. Accordingly, the print instructions to the three-dimensional printer can be modified or adjusted to accommodate the actual orientation of the voxel structure.

Figure 4C:
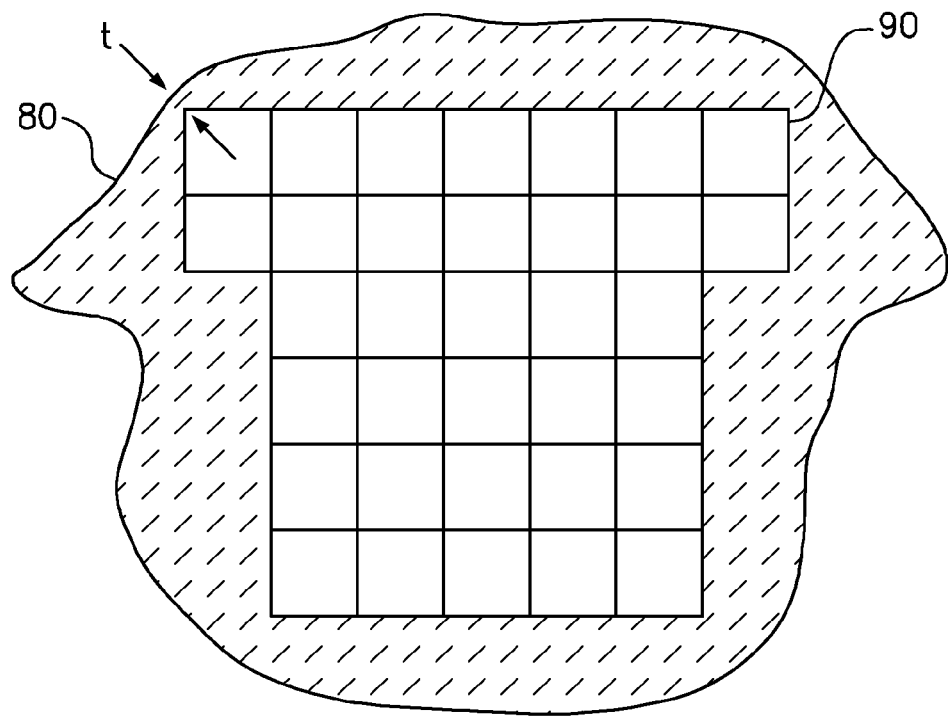
FIGS. 4C-*d* are cross-sectional diagrams of the three-dimensional object showing that the voxel structure is subsumed within the three dimensional object.
Figure 4D:
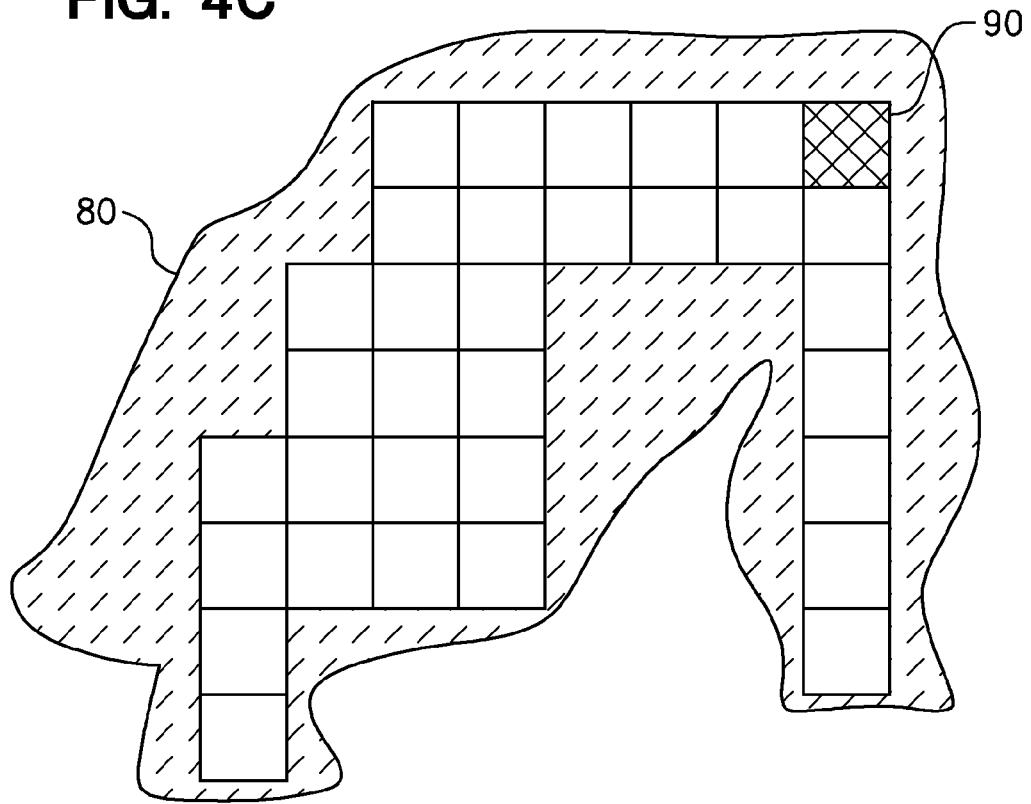

FIGS. 4C-D are cross-sectional diagrams of the three-dimensional object 80 showing that the voxel structure 90 is subsumed within the three dimensional object. In particular, FIG. 4C is a lateral cross-sectional diagram taken along the lateral plane indicated in FIG. 4A, and FIG. 4D is a longitudinal cross-sectional diagram taken along the longitudinal plate indicated in FIG. 4A. In each of FIGS. 4C-D, the cross-sectional diagrams show that the relevant cross-section of the voxel structure 90 is subsumed within (i.e., entirely inside the boundaries of) the object 80. In one embodiment, lateral and longitudinal cross-sections of the object are checked along each grid line of the three-dimensional grid that overlays the object. If the voxel structure is subsumed by the object in each cross-section, then it may be assumed that the voxel structure is subsumed by the object. However, it is possible to specifying a minimum depth or thickness (t) of the printed material over all points of the voxel structure. If one or more of the cross-sections show that a voxel is too close to the boundary or surface of the object (i.e., the depth (t) is less than the specified minimum depth), then the adjacent voxel may be eliminated from the voxel structure.

Figure 5A:
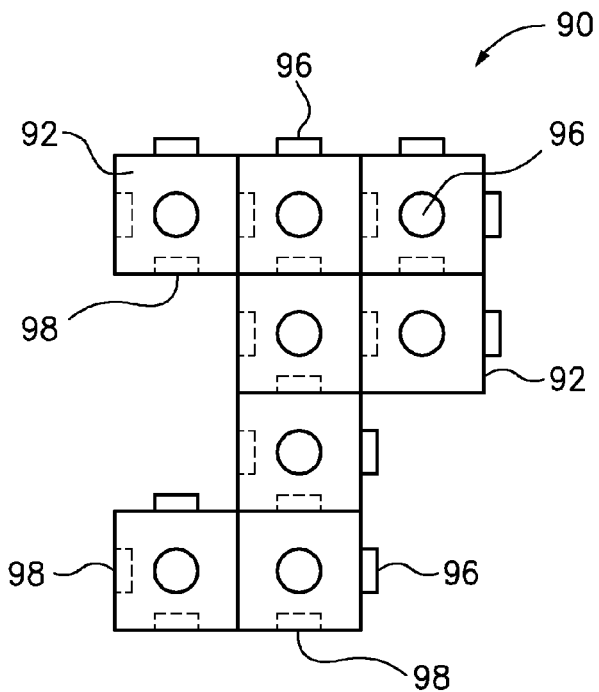
FIG. 5A is a side view of a voxel structure made up of interlocking blocks.
Figure 5B:
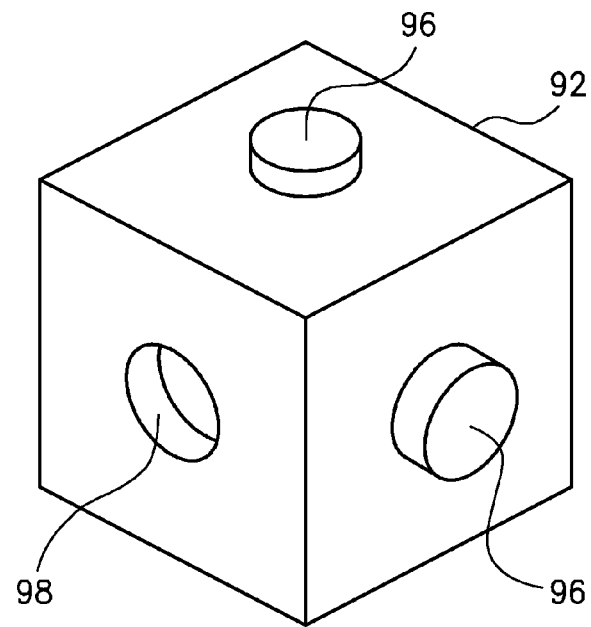
FIG. 5B is a perspective view of a single interlocking voxel.

FIG. 5A is a side view of a voxel structure 90 made up of interlocking voxels 92 (rectangular blocks). In the example shown, each voxel or block 92 has cylindrical extensions 96 on three adjacent sides and mating cylindrical recesses 98 on the three other adjacent sides. Accordingly, a three-dimensional voxel structure 90 can be assembled by interlocking individual voxels. FIG. 5B is a perspective view of a single interlocking voxel 92, showing the cylindrical extensions 96 and cylindrical recesses 98 in greater detail. Alternative types, styles and configurations of interlocking features may also be used in accordance with the present invention.

Figure 6:
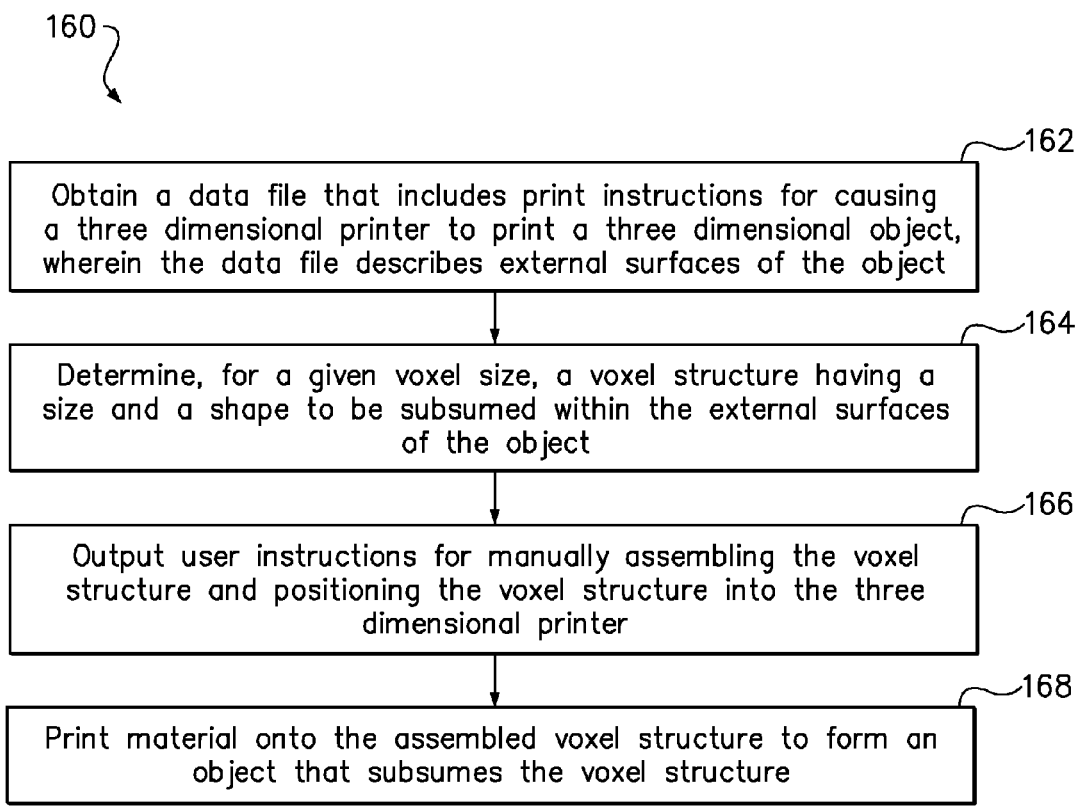
FIG. 6 is a flowchart of a method in accordance with one embodiment of the present invention.

FIG. 6 is a flowchart of a method 160 in accordance with one embodiment of the present invention. In step 162, the method obtains a data file that includes print instructions for causing a three dimensional printer to print a three dimensional object, wherein the data file describes external surfaces of the object. Step 164 determines, for a given voxel size, a voxel structure having a size and a shape to be subsumed within the external surfaces of the object. In step 166, user instructions are output for manually assembling the voxel structure and positioning the voxel structure into the three dimensional printer. Then, material is printed onto the assembled voxel structure, in step 168, to form an object that subsumes the voxel structure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith, the program instructions executable by a processor to cause the processor to perform a method comprising:
   obtaining a data file that includes print instructions for causing a three dimensional printer to print a three dimensional object, wherein the data file describes external surfaces of the object;
   determining, for a given voxel size, a voxel structure having a size and a shape to be subsumed within the external surfaces of the object;
   outputting user instructions for manually assembling the voxel structure and positioning the voxel structure into the three dimensional printer; and
   printing material onto the assembled voxel structure to form the object that subsumes the voxel structure.

2. The computer program product of claim 1, wherein printing material onto the voxel structure allows the object to be formed in less time than without the voxel structure.

3. The computer program product of claim 1, wherein printing material onto the voxel structure includes printing material onto upward-facing and side-facing surfaces of the voxel structure.

4. The computer program product of claim 1, wherein printing material onto the voxel structure includes printing material onto surfaces of the voxel structure until the voxel structure is hidden within the interior of the object.

5. The computer program product of claim 1, wherein the voxel structure is formed from a plurality of rectangular blocks.

6. The computer program product of claim 5, wherein the printed material secures the rectangular blocks together and provides contour around the blocks.

7. The computer program product of claim 5, wherein the rectangular blocks include interlocking features for securing two or more of the rectangular blocks together in a desired configuration.

8. The computer program product of claim 1, wherein the voxel structure is formed from two or more preformed components selected from a plurality of preformed components, wherein each preformed component has a predetermined shape, size and mass.

9. The computer program product of claim 8, the method further comprising:
   maintaining an inventory of the preformed components.

10. The computer program product of claim 1, wherein the voxel structure is configured so that the object will have at least a minimum depth of printed material.

11. The computer program product of claim 1, wherein the voxel structure has no downwardly facing surfaces other than along the base of the assembled voxel structure.

12. The computer program product of claim 1, wherein the user instructions are output by illustrating a model of the voxel structure on a display screen.

13. The computer program product of claim 1, wherein the user instructions include step-by-step text.

14. The computer program product of claim 1, the method further comprising:
   including one or more orientation block in a predetermined position within the voxel structure, wherein the orientation block has a unique and detectable characteristic;
   scanning the assembled voxel structure after positioning within the three-dimensional printer to determine the orientation of the voxel structure; and
   wherein printing material onto the voxel structure to form the object includes modifying control of the three-dimensional printer to adjust to the determined orientation of the voxel structure.

15. The computer program product of claim 14, wherein the unique and detectable characteristic is color.

16. The computer program product of claim 14, wherein the unique and detectable characteristic is an identifier printed on an exposed surface of the block.

17. The computer program product of claim 1, the method further comprising:
   printing a base portion of the object; and
   positioning the assembled voxel structure into the three-dimensional printer on the base portion before printing material onto the voxel structure to form the object that subsumes the voxel structure.

18. The computer program product of claim 17, wherein the base portion of the object has at least one region with space below the at least one region.

19. The computer program product of claim 17, wherein the base portion is printed to include a recess having a shape and size for receiving the assembled voxel structure.

20. A method, comprising:
   obtaining a data file that includes print instructions for causing a three dimensional printer to print a three dimensional object, wherein the data file describes external surfaces of the object;
   determining, for a given voxel size, a voxel structure having a size and a shape to be subsumed within the external surfaces of the object;
   outputting user instructions for manually assembling the voxel structure and positioning the voxel structure into the three dimensional printer; and
   printing material onto the assembled voxel structure to form the object that subsumes the voxel structure.

* * * * *